June 24, 1924.

J. L. HERR

GARDEN PEG

Filed Feb. 16, 1922

1,498,628

J. L. Herr  Inventor

Patented June 24, 1924.

1,498,628

UNITED STATES PATENT OFFICE.

JOHN LANDIS HERR, OF EAST EARL, PENNSYLVANIA.

GARDEN PEG.

Application filed February 16, 1922. Serial No. 537,140.

*To all whom it may concern:*

Be it known that I, JOHN LANDIS HERR, a citizen of the United States, residing at East Earl, in the county of Lancaster and State of Pennsylvania, have invented a new and useful Garden Peg, of which the following is a specification.

This invention relates to garden implements, the primary object of the invention being to provide means for forming openings in the ground surface to facilitate the planting of small plants.

Another object of the invention is to provide a device of this character having an adjustable foot engaging portion which is especially designed to act as a gauge and restrict movement of the device in the ground surface.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
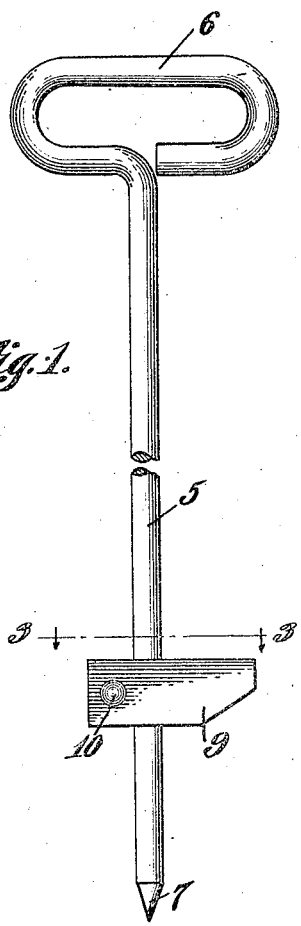
Figure 1 is an elevational view of a device constructed in accordance with the present invention.

Referring to the drawing in detail, the device includes a rod indicated at 5 which has its upper end formed into a hand-hold 6 to be gripped by the hand of the operator to steady the device when the same is being forced into the ground surface.

The lower extremity of the rod is tapered as at 7, so that the same will pierce the ground surface and allow the same to move readily, while in use.

The foot engaging portion as shown by Figure 1 of the drawing, is in the form of a block having a cut away portion providing opposed arms 8, a portion adjacent to the inner extremity of the cut out portion being circular in formation to conform to the curvature of the rod 5 and insure a close fit between the foot engaging portion which is indicated at 9, and the rod 5.

A bolt 10 extends through suitable openings in the arms 8 to connect the arms, there being provided a nut 11 on the threaded end of the bolt so that when the nut is screwed home, the arms will be moved towards each other to cause the same to grip the rod on which the same is mounted.

Figure 2:
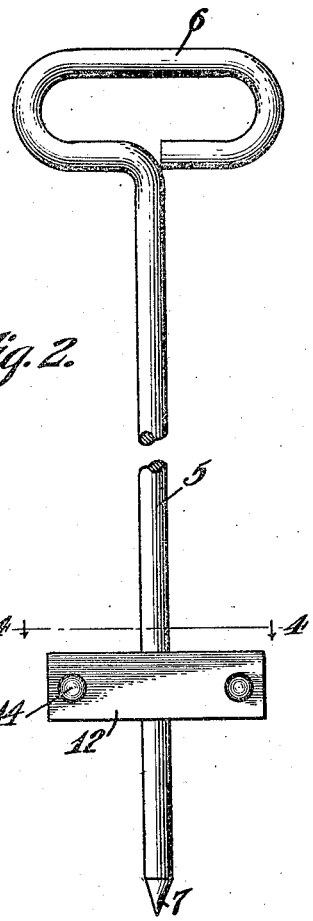
Figure 2 is an elevational view of the device showing the modified form of foot engaging portion.
Figure 3:
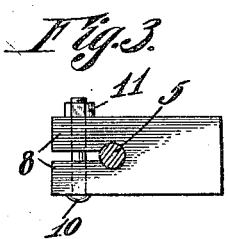
Figure 3 is a sectional view taken on line 3—3 of Figure 1.
Figure 4:
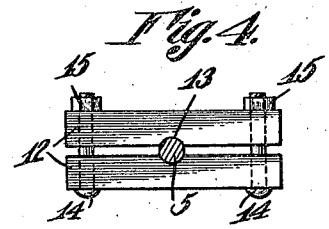
Figure 4 is a sectional view taken on line 4—4 of Figure 2.

In the form of the invention as shown by Figure 2 of the drawing, the foot engaging portion embodies a pair of bars 12 which have semi-circular cut out portions 13 formed intermediate the ends thereof, the semi-circular portions cooperating to embrace a portion of the rod 5. At each end of the respective bars are formed suitable openings to accommodate the bolts 14, which are provided with nuts 15 that may be moved to force the bars 12 into gripping relation with the rod 5. Thus it will be seen that by loosening the nuts 15, the bars 12 may be adjusted along the rod 5 to arrange the same at various distances from the tapered portion 7 thereof, adapting the device for use by persons of various heights.

It might be further stated that the adjustable foot rest also contacts with the ground surface to restrict movement of the device to insure the openings being of a uniform depth, the foot rest acting as a gauge.

Having thus described the invention, what is claimed as new is:—

In a garden implement, a rod having a pointed end and a hand-hold formed at the opposite end, an adjustable foot rest on the rod, said foot rest including spaced members, said spaced members having curved portions to accommodate the rod, bolts for connecting the spaced members, nuts on the bolts for moving the spaced members into close engagement with the rod to permit of adjustment of the foot rest with respect to the pointed end of the rod.

In testimony that I claim the foregoing as my own, I have hereto affixed my signature in the presence of two witnesses.

JOHN LANDIS HERR.

Witnesses:
M. G. WEAVER,
C. R. WEAVER.